UNITED STATES PATENT OFFICE.

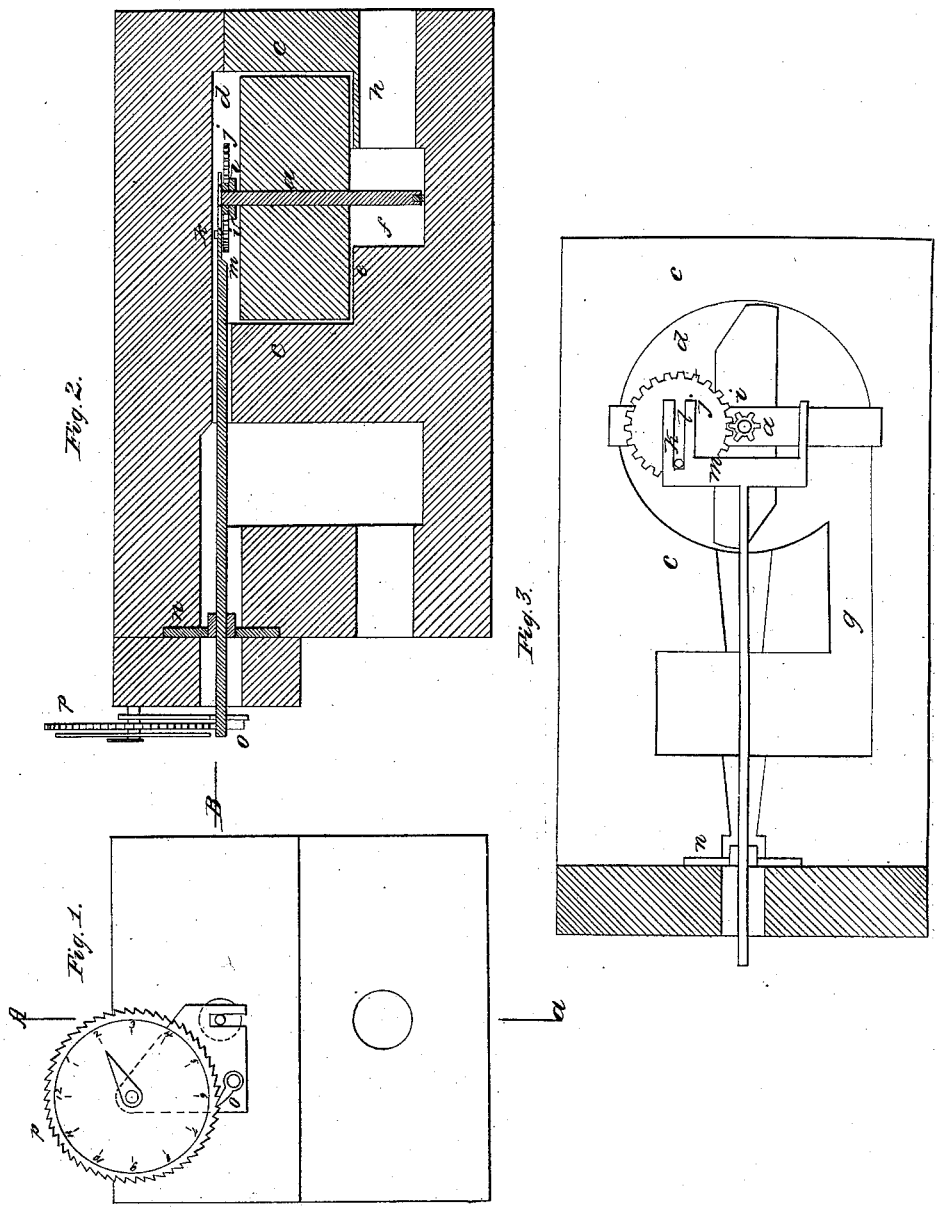

HENRY ISHAM, OF NEW BRITAIN, CONNECTICUT.

IMPROVEMENT IN WATER-METERS.

Specification forming part of Letters Patent No. 34,060, dated January 7, 1862.

*To all whom it may concern:*

Be it known that I, HENRY ISHAM, of New Britain, in the State of Connecticut, have invented a new and useful Improvement in Water-Meters; and I do hereby declare that the following is a full, clear, and exact description thereof, reference being had to the accompanying drawings, making part of this specification, in which—

Figure 1 is an end elevation; Fig. 2, a longitudinal vertical section taken in the plane of the line A $a$ of Fig. 1, and Fig. 3 a horizontal section taken in the plane of the line B $b$ of Fig. 2.

The same letters indicate like parts in all the figures.

So far as I am informed on the subject, water-meters as heretofore made either do not give an accurate measurement of the water which passes through them, or, if so organized as to measure the water accurately, the moving parts are too liable to derangement, and produce so much friction that they cannot be operated without a considerable head of water.

The object of my invention is to avoid these objections; and my said invention consists in the employment of wings or vanes on a vertical shaft placed within a surrounding circular casing provided with an induction-passage for the entrance of the water to be measured, so that it will enter the said casing in a tangent to the circle, or nearly so, to act upon the wings or vanes, and the said casing being also formed with a discharge-aperture at the bottom, so that the water in passing through shall move in a whirlpool to insure the turning of the vanes in such manner as to indicate accurate measurement of the water which passes through without the necessity of having the moving parts to fit closely. The mode of operation is such that the water, entering in a tangent to the circle of the vanes, or nearly so, will move toward the center in an inverted spiral, forming what is termed a "whirlpool," until it escapes from the center. The weight of the water forming the whirlpool rests on the bottom of the surrounding casing, so that neither the weight nor the pressure of the water can induce friction, and the only friction will be due to the weight of the vanes and their shaft with the necessary mechanism for indicating the number of revolutions.

In the accompanying drawings, $a$ represents a vertical shaft with radial vanes, and $c$ a surrounding casing, forming a circular water-chamber, $d$. The diameter and depth of this water-chamber are such as to just clear the edges of the vanes, that they may not touch as they revolve within it. The central portion of this water-chamber extends down below the general bottom $e$ to form a concentric pit, $f$, surrounding the lower end of the shaft $a$.

The water to be measured enters the water-chamber $d$ by a water-way, $g$, which is tangent to the circle of the chamber, or nearly so, and its tendency independently of all other influences would be to continue to move in the line of the tangent; but the circular form of the chamber deflects it and causes it to travel in a circle, and this is again modified by having an eduction-passage, $h$, leading from the central pit, through which the water is discharged, and as the pressure of the column tends toward this discharge, which is below the vanes, and from the periphery of this pit, which is of much less diameter than the water-chamber, it results that the water from the moment it enters the chamber $d$ travels in a line which would generate an inverted spiral, or nearly so, and while thus traveling it acts upon and carries the vanes around until it enters the pit on its way to the escape-passage.

I have found by repeated experiments under various heads and various modifications of the proportions between the induction and the eduction passages that the shaft always makes the same number of revolutions for the discharge of a given quantity of the water, so that by determining the quantity for each revolution and making the index to correspond the number of revolutions made by the shaft will always give the quantity of water which has passed through the meter. The number of revolutions I indicate by the following means: On the upper end of the shaft $a$, but within the water-chamber, there is a cogged pinion, $i$, which engages a cog-wheel, $j$, also within the water-chamber, and this wheel carries a wrist or crank pin, $k$, which, during the revolutions, plays in a slot, $l$, in the end of a lever, $m$, which is thereby vibrated. This lever passes through and is properly secured to a disk, $n$, of india-rubber, or other flexible and water-tight substance. The outer extremity of this lever carries a ratchet-hand, $o$, which at every vibration acts on the teeth of an index-wheel, p, to indicate and register the number of revolutions. By this means I avoid all the friction and liability to derangement due to the use of packing-boxes or other packed joints, and all the power required to work this is simply to bend the flexible disk or diaphragm.

It will be obvious that the crank for vibrating the lever might be applied directly to the shaft a, and the sole object of putting it on the cog-wheel is to reduce the number of vibrations; and it will also be obvious that this part of my invention may be dispensed with by carrying the shaft a, or some other moving part deriving motion from the shaft a, through a stuffing-box or other packed joint; but the friction induced thereby will be found seriously objectionable on account of the power required and the variability of this friction.

I wish it to be understood that I do not limit the first part of my invention to the use of the specific kind of registering mechanism herein described, nor to the use of a flexible diaphragm as a means of connection between the shaft of the rotating vanes and the register, as any other suitable and equivalent mechanism for registering and imparting motion to such mechanism may be substituted in making water-meters under the first part of my said invention.

What I claim as my invention, and desire to secure by Letters Patent, is—

1. The combination of the following elements, viz: first, the radial vanes on a vertical shaft; second, the surrounding case provided with a tangential induction pipe or passage and with a central discharge at the bottom; and, third, the registering mechanism or the equivalent thereof, substantially as and for the purpose described.

2. The flexible diaphragm and vibrating lever attached to it, in combination with the shaft of the rotating vanes and with the registering mechanism, substantially as and for the purpose specified.

HENRY ISHAM.

Witnesses:
WM. H. BISHOP,
ANDREW DE LACY.